United States Patent [19]
Kelch et al.

[11] Patent Number: 5,695,870
[45] Date of Patent: Dec. 9, 1997

[54] LAMINATED FOAM INSULATION BOARD OF ENHANCED STRENGTH

[75] Inventors: Robert H. Kelch; Douglas V. Bibee; Ronald D. Deibel; Deborah L. Kocsis, all of Granville, Ohio

[73] Assignee: The Dow Chemical Company, Midland, Mich.

[21] Appl. No.: 679,315

[22] Filed: Jul. 12, 1996

Related U.S. Application Data

[63] Continuation of Ser. No. 418,045, Apr. 6, 1995, abandoned.

[51] Int. Cl.$^6$ .................................................. B32B 7/00
[52] U.S. Cl. ........................... 428/318.4; 428/317.1; 428/317.7; 428/319.3; 428/319.7; 428/334; 428/339
[58] Field of Search .................... 428/317.1, 317.7, 428/318.4, 319.3, 319.7, 334, 339

[56] References Cited

U.S. PATENT DOCUMENTS

| | | | |
|---|---|---|---|
| 3,563,845 | 2/1971 | Stevens | 161/160 |
| 3,565,746 | 2/1971 | Stevens | 161/160 |
| 3,619,344 | 11/1971 | Wolinski | 161/161 |
| 4,011,357 | 3/1977 | Haase | 428/215 |
| 4,180,427 | 12/1979 | Bertsch | 156/272 |
| 4,452,751 | 6/1984 | McCullough et al. | 264/45.5 |
| 4,515,907 | 5/1985 | McCullough et al. | 521/139 |
| 4,645,710 | 2/1987 | Baitinger et al. | 428/317.7 |
| 4,687,534 | 8/1987 | Alford et al. | 156/308.6 |
| 4,764,420 | 8/1988 | Gluck et al. | 428/317.7 |
| 4,832,775 | 5/1989 | Park et al. | 156/272.6 |
| 5,120,481 | 6/1992 | Braclanan et al. | 264/51 |

OTHER PUBLICATIONS

Amoco Foam Products Company, *Extruded Polystyrene Insulation*, 1990, p. 6.
Amoco Foam Products Company, *Building Insulation*, 1993, pp. 2, 7, 10-13.

*Primary Examiner*—Kathleen Choi
*Attorney, Agent, or Firm*—J. Robert Dean, Jr.

[57] ABSTRACT

Disclosed is a laminated foam insulation board having enhanced strength and resistance to bending and breaking. The board comprises a panel of an insulating plastic foam material and a thermoplastic facer film adhered to opposite surfaces of the panel. The facer films have an ultimate elongation of less than 200 percent in both machine and transverse directions, a yield tensile strength of at least 7,000 pounds per square inch (48,400 kilopascals) in both machine and transverse directions, and a 1 percent secant modulus of at least 200,000 pounds per square inch (1,380 megapascals) in both machine and transverse directions. The degree of adhesion is about 100 grams per inch or more (about 39.4 grams per centimeter or more) between the facer film and the foam panel.

24 Claims, 1 Drawing Sheet

LAMINATED FOAM INSULATION BOARD OF ENHANCED STRENGTH

CROSS-REFERENCE TO RELATED APPLICATION

This is a continuation of application Ser. No. 08/418,045, filed Apr. 6, 1995, now abandoned.

BACKGROUND OF THE INVENTION

This invention relates to a laminated foam insulation board having enhanced strength and resistance to bending and breaking.

Foam insulation boards are commonly used to enhance insulation of building structures. Relatively thin (about ¼ inch (6.4 millimeters (mm)) to about 2.0 inches (55 mm)), rectangular panels of foam board are commonly applied to walls of building structures. Such panels are referred to in the trade as "residential foam sheathing". Foam boards employed in such applications include those of extruded polystyrene foam, polystyrene bead foam, and polyisocyanurate foam.

A problem encountered when using thin foam boards is physical damage from bending, impact, or breaking. Such damage may occur by acts of vandalism, high velocity winds, construction practices, and the like. In construction, it is common for ladders leaned against vertical walls to bend or break attached foam boards. It is also common for construction personnel to kneel upon foam boards attached to horizontal walls while such walls are being assembled prior to vertical erection.

One means of addressing the problem of physical damage is to apply a facing material to at least one side of the foam board to strengthen it. Examples of such facing materials include thermoplastic films, metal foil, paper or thin cellulose films, non-woven polymeric fabrics, fiberglass scrims, and combinations of the foregoing. Plastic film is used commercially as a facing material for extruded polystyrene and expanded polystyrene bead foam boards (known commercially as "bead board"). Metal foil, paper, fiberglass scrims, and combinations of these are used commercially as facing materials for polyisocyanurate, extruded polystyrene, and expanded polystyrene bead foam boards.

The various facing materials have their own unique advantages and disadvantages. Plastic film has the advantages of easy application, economical cost, optional transparency, and easy recyclability when employed with polystyrene foam boards. Metal foil has the advantages of easy application, vapor barrier resistance, and infrared and ultraviolet reflectivity. However, metal foil is not easily recyclable with the foam board either during the manufacturing process or after consumer use and is generally more expensive than plastic film. Fiberglass scrim has the advantage of excellent strength, but is relatively expensive, difficult to recycle, and causes a significant amount of itching and discomfort to construction personnel during installation.

It would be desirable to use a facing material which is strong, easy to apply, economical, weatherable, moisture resistant, temperature stable, optionally transparent, and readily recyclable with polystyrene foam boards. Recyclability with polystyrene foam boards and the option of transparency necessitate the facing material be a thermoplastic plastic film.

Polystyrene foam boards used in residential sheathing applications and employing thermoplastic facer films have encountered fracture problems from bending and impact.

Such problems arise because the boards are relatively thin, e.g., about 0.5 inch (about 12.7 mm) to about 1.0 inch (about 25.4 mm), and have insufficient strength contributions from the facer films, which typically are relatively thin (0.5 mil to 2.0 mil) and of low tensile strength.

Fractures may form in the foam board from either compressive or tensile stresses. Fractures typically propagate at the surfaces of unlaminated boards and the foam panel/facer film interfaces of laminated boards. Compressive stresses are encountered at the surface or foam panel/facer film interface being impacted or pushed inward by an external force. Tensile stresses are encountered at the surface or foam panel/facer film interface at the opposite foam surface being pushed outward by their external force.

It would be desirable to have a laminated foam insulation board, particularly a polystyrene foam board, which employs a thermoplastic facer film and affords enhanced board strength and resistance to bending and breaking compared to conventional boards having conventional plastic facer films.

BRIEF DESCRIPTION OF THE DRAWINGS

The features of the present invention will be better understood upon viewing the drawings together with the remainder of the specification.

SUMMARY OF THE INVENTION

Figure 1:
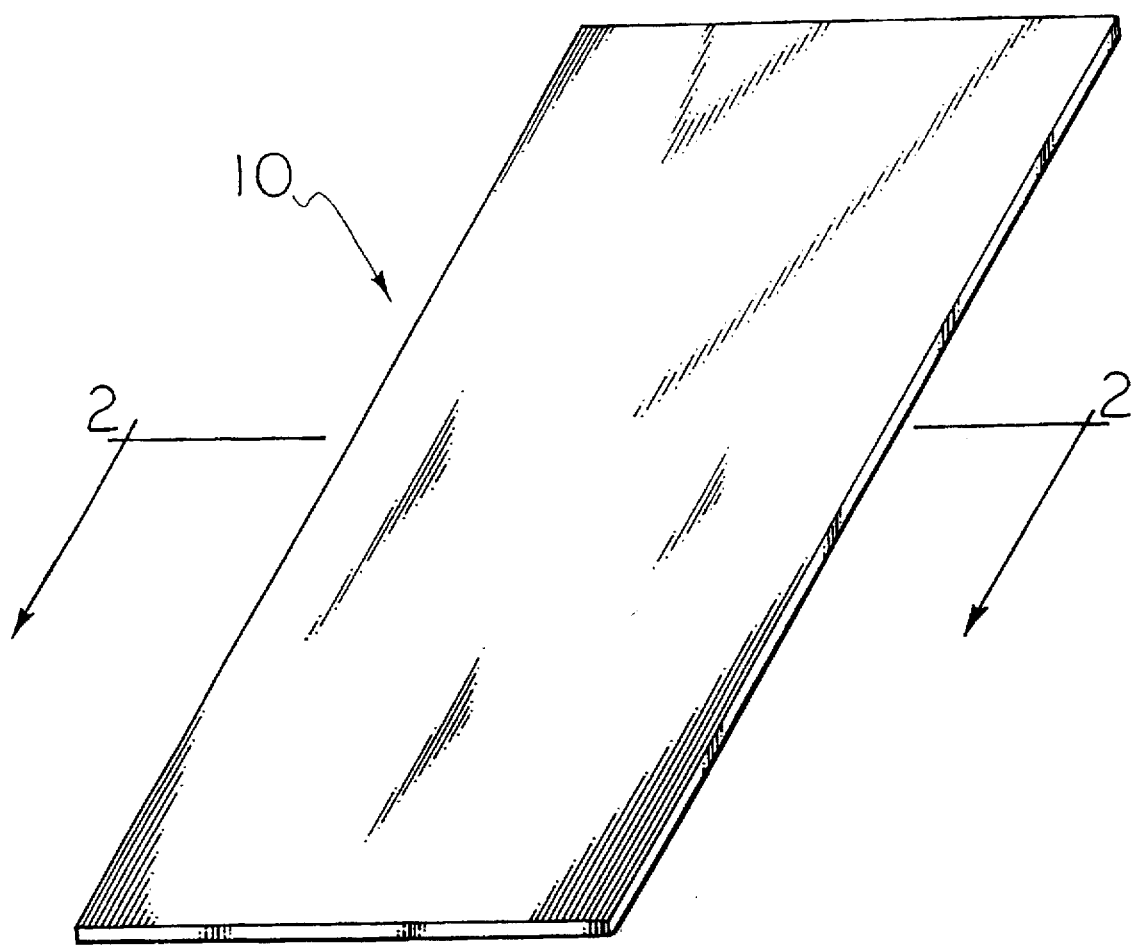
FIG. 1 shows a prospective view of the foam laminate board of the present invention.
Figure 2:
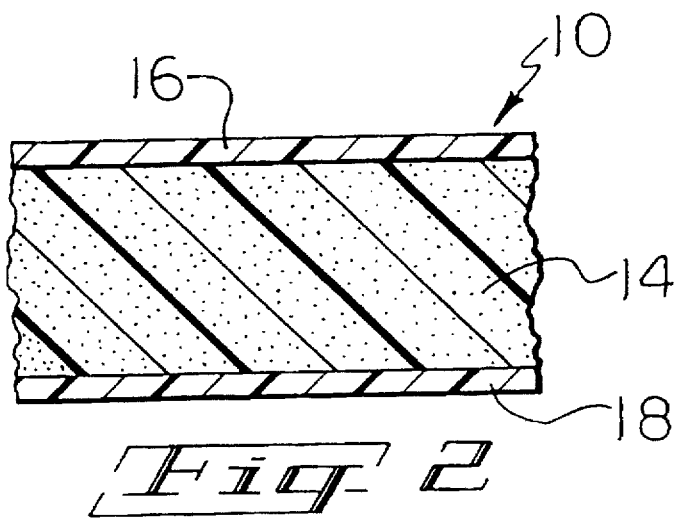
FIG. 2 shows an enlarged, fragmentary, cross-sectional view of the board of FIG. 1 along a line 2—2.

According to the present invention, there is a laminated foam insulation board comprising a panel of a plastic foam material and first and second thermoplastic plastic facer films adhered to at least one and preferably both primary surfaces of the panel. The facer film has an ultimate elongation of less than 200 percent in both machine and transverse directions, a yield tensile strength of at least 7,000 pounds per square inch (psi) (48,400 kilopascals (kPa)) in both machine and transverse directions, a 1 percent secant modulus of at least 200,000 psi (1,380 megapascals (mPa)) in both machine and transverse directions. The degree of adhesion between the facer film and the foam panel is about 100 grams/inch (gm/in.) or more (about 39.4 grams/centimeters (gm/cm) or more). The laminate insulation board has enhanced strength and resistance to bending and breaking.

DETAILED DESCRIPTION

The laminated foam insulation board of the present invention comprises a foam panel and thermoplastic plastic facer films adhered to the primary opposite surfaces of the foam panel. The laminated foam insulation board exhibits substantially improved physical strength and abuse resistance over prior art foam boards employing thermoplastic facer films.

The inventors have discovered that laminated foam insulation boards of desirable strength and flexural modulus can be made by laminating thermoplastic facer films exhibiting high tensile strength and low elongation to the foam panel. The film must exhibit an ultimate elongation of less than 200 percent in both machine and transverse directions, a yield tensile strength of at least 7,000 psi (48,400 kPa) and preferably 10,000 psi (59,100 kPa) or more in both machine and transverse directions, and a 1 percent secant modulus of at least 200,000 psi (1,380 mPa) in both machine and transverse directions. The exhibition of these levels of physical properties in both the machine and transverse directions (two dimensions) in the film enables the foam board to withstand a variety of mechanical stresses such as impact, bending, and torsion. The facer films prevent or substantially reduce the likelihood of propagation of fractures at the foam panel/film facer interface. The above physical properties are with respect to unlaminated film and are measured according to ASTM D-882.

Facer films with insufficient yield tensile strength will exhibit tensile elongation during stress application. If such a film is laminated to a foam substrate and subsequently subjected to substantial impact or stress, the laminated foam board will bend to where the foam panel begins to fracture at the facer film/foam panel interface. The facer film elongates over the fracture at the interface allowing propagation of the fracture to continue resulting in ultimate failure of the board. Facer films with high yield strength and low elongation characteristics substantially inhibit and prevent failure of the board. Sufficient facer film secant modulus, or stiffness, enhances the overall flexural modulus of the board.

It is critical the facer film be laminated to both primary, opposite surfaces of the foam panel to achieve a laminated board of improved strength.

The plastic facer film may be composed of any thermoplastic polymer as long as it meets the physical property criteria above and can be effectively laminated to the foam panel. The facer film may be comprised of polyolefins, alkenyl aromatic polymers, polyesters, polycarbonates, and acrylic or polyamide polymers. Useful polyolefins include polyethylene and polypropylene. Useful polyethylenes include high density polyethylene, low density polyethylene, and linear low density polyethylene. The film may be non-oriented, uniaxially oriented, or biaxially oriented. Preferred facer films are biaxially oriented films of polyethylenes, polypropylene, polyesters, polystyrene, or polyamides. The film may be cross-linked or non-crosslinked. The film may optionally contain conventional inorganic fillers, pigments, or colorants, antioxidants, ultra-violet stabilizers, fire retardants, processing aids, and the like.

The facer film may be in the form of a monolayer or a coextruded multilayer film. The facer film ranges from about 0.35 to about 10.0 mils (thousandths of an inch thick) (8.9 to 240 micrometers) and preferably ranges from about 0.5 to about 3.0 mils (12.7 to 76 micrometers) thick.

The facer film may be laminated to the present foam board by any conventional method known in the art. Useful lamination methods include hot roll lamination of a heat activated adhesive layer on the facer film. Another method is liquid coating or spraying coating of an adhesive melt or liquid-based adhesive onto the facer film or foam board prior to lamination. An adhesive melt may also be extruded onto the facer film or foam prior to lamination. The facer film may be coextruded with an adhesive layer, and subsequently laminated to the foam board.

The degree of adhesion between the facer film and foam panel is sufficient to ensure adhesion during impact or bending. Separation or slipping between the film facer and foam panel at their interface negates the strengthening effect of the facer film. The degree of adhesion between the facer film and foam board is preferably such that any failure occurs within the foam rather than in the film upon bending of the laminate board. It is preferred that the degree of adhesion is such that part or all of the skin of the foam can be pulled off the remainder of the foam when the film is peeled off the foam. The adhesive must adhere to both the facer film and the foam panel substrate. The degree of adhesion is about 100 gm/in. or more (about 39.4 gm/cm or more) and preferably about 250 gm/in. or more (about 98.5 gm/cm or more), according to the 180 degree peel test (ASTM D-903).

Suitable materials for use as adhesives or in adhesive layers include those adhesive materials known in the art as useful with plastic films and foams. They include polyolefin copolymers such as ethylene/vinyl acetate, ethylene/acrylic acid, ethylene/n-butyl acrylate, ethylene/methylacrylate, ethylene ionomers, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermoset polymers, and can include tacky, pressure-sensitive adhesives. The adhesive or adhesive layers is preferably recyclable within the foam board manufacturing process. The adhesive material must not negatively impact the physical integrity or properties of the foam to a substantial degree.

The foam panel or foam core stock of the present foam board may take the form of any insulation foam known in the art such as extruded polystyrene foam, expanded polystyrene bead foam, extruded polyolefin foam, expanded polyolefin bead foam, polyisocyanurate foam, and polyurethane foam.

The present invention is particularly useful with extruded polystyrene foam and expanded polystyrene bead foam (known in the industry as "beadboard"). Such foams are readily recyclable, and thermoplastic facer films and adhesive materials are readily recyclable with the foams. Recyclability means the foams can be ground into scrap which can be melted and processed with virgin polymer materials, blowing agents, and additives to form new foams. Further, the attractive appearance of the foams can be maintained by using transparent facer films and adhesive materials. The facer films also substantially enhance the strength of thin polystyrene foam boards useful in insulating sheeting applications, particularly those boards of thicknesses of about ¼ in. to about 1 in. (about 6.4 mm to about 25.4 mm).

Polystyrene foams may be derived from conventional alkenyl aromatic polymer materials. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent) and most preferably entirely of polystyrene.

An extruded polymer foam is generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric, subatmospheric (evacuated or vacuum), or at an atmospheric level.

Expanded bead foams may be formed by expansion of pre-expanded beads containing a blowing agent. The expanded beads may be molded at the time of expansion to form articles of various shapes. Processes for making pre-expanded beads and molded expanded bead articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989), which are incorporated herein by reference.

Though thermoplastic facer films are particularly useful laminated to polystyrene foam boards, they are also useful laminated to polyisocyanurate and polyurethane foam boards to enhance their strength as well.

Polyurethane and polyisocyanurate foam structures are usually made by reacting two preformulated components, commonly called the A-component and the B-component. The preformulated components comprise an isocyanate and a polyol.

Polyurethane foams can be prepared by reacting the polyol and the isocyanate on a 0.7:1 to 1.1:1 equivalent basis. Polyisocyanurate foams can be advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. No. 4,795,763, which is incorporated herein by reference.

Selection of a blowing agent is not critical to the present invention. Blowing agents useful in making the foam board will vary depending upon the composition of the foam, and can include inorganic blowing agents, organic blowing agents and chemical blowing agents. Suitable inorganic blowing agents include carbon dioxide, argon, and water. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Particularly useful agents include n-butane, isobutane, n-pentane, isopentane, ethanol, 1,1-difluoroethane (HFC-152a), 1,1,1,2-tetrafluoroethane (HFC-134a), ethyl chloride, 1,1-dichloro-1-fluoroethane (HCFC-141b), and 1-chloro-1,1-difluoroethane (HCFC-142b).

Various additives may be incorporated in the foams such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium dioxide, silica, barium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The polystyrene foams have a density of from about 10 kilograms per cubic meter ($kg/m^3$) to about 150 $kg/m^3$ and most preferably from about 10 $kg/m^3$ to about 70 $kg/m^3$ according to ASTM D-1622-88. The polystyrene foams have an average cell size of from about 0.1 mm to about 5.0 mm and preferably from about 0.2 mm to about 1.5 mm according to ASTM D3576-77.

The polyisocyanurate foams and polyurethane foams have a density of from about 10 $kg/m^3$ to about 150 $kg/m^3$ and most preferably from about 10 $kg/m^3$ to about 70 $kg/m^3$ according to ASTM D-1622-88. The polyisocyanurate foams and polyurethane foams have an average cell size of from about 0.05 mm to about 5.0 mm and preferably from about 0.1 mm to about 1.5 mm according to ASTM D3576-77.

The polystyrene foams may be closed cell or open cell, but are preferably closed cell. Preferably, the present foam is greater than 90 percent closed-cell according to ASTM D2856-87.

The present foam board may be used to insulate a surface or an enclosure or building by applying the board to the same. Other useful insulating applications include in roofing, refrigeration, and the like.

The following are examples of the present invention, and are not to be construed as limiting. Unless otherwise indicated, all percentages, parts, or proportions are by weight.

EXAMPLES

Laminate foam boards of the present invention were produced and tested for application stress resistance.

Facer films were laminated to both primary surfaces of extruded polystyrene foam panels to form the laminate foam boards. The facer films varied in thickness and composition. The facer films were adhered to the foam panels by various methods. The facer films were tested for the physical properties of yield tensile strength, ultimate percent elongation and 1 percent secant modulus according to ASTM D-882. The physical properties of the facer films are set forth in Table 1.

The facer films and adhesive layers variously comprised linear low density polyethylene (LLDPE), low density polyethylene (LDPE), and ethylene/vinyl acetate (EVA) copolymer. The LLDPE was an ethylene/octene copolymer having a density of 0.92 gm/cm$^3$ and a melt index (M.I.) of 1.0 according to ASTM D1238. The LDPE had a density of 0.922 gm/cm$^3$ and a M.I. of 1.2 (ASTM D1238). The EVA was of 82/18 ethylene/vinyl acetate by weight and had a density of 0.95 gm/cm$^3$ and a 8.0 M.I. (ASTM D1238).

The extruded polystyrene foam panels were 0.5 inch (12.7 mm) thick and 4 feet (ft) by 8 ft (1.2 meters (m) by 2.4 m) in dimension. The panels had a density of about 2.0 pounds per cubic foot (32 kg/m$^3$).

The laminated foam boards were subjected to a variety of application mechanical tests to determine resistance to bending and breaking. The test data are set forth in Table 2.

To evaluate resistance to bending and breaking, the foam boards were subjected to the "ball drop" test. In this test, the foam boards were individually clamped onto a 4 ft by 8 ft (1.2 m by 2.4 m) horizontal stud or building frame wall with 16 in. (41 cm) centers. The foam boards themselves were 0.5 in. thick by 4 ft by 8 ft (1.3 cm thick by 1.2 m by 2.4 m). The boards were then impacted by a falling ball having a weight of 4.32 pounds (1.96 kilograms) and a diameter of 3.0 in. (7.6 cm). The ball was dropped from a height of 36 in. (91 cm) to the center of the foam board between the 16 in. (41 cm) centers. The foam boards were examined for extent of damage resulting from the falling ball.

To evaluate further resistance to bending and breaking, the foam boards were subjected to the "kneeling" test. The kneeling test simulates a ladder bearing a person leaning against a foam board attached to a vertically-erected frame wall or a person or persons kneeling on a foam board attached to a horizontally-disposed frame wall as the frame wall is being constructed.

In the kneeling test, four different individuals ranging in weight from approximately 100 to 220 pounds (45 to 100 kilograms) were allowed to kneel, crawl, or walk in sequence (one after the other) upon foam boards between the 16 in. (41 cm) centers of a horizontally-disposed frame wall. Each person trod on a different board. The physical integrity of the foam board and its resistance to bending and fracture were subjectively evaluated on a 1–5 scale (1=fracture through board, 5=no damage). Samples of each foam board were tested and the results averaged.

To evaluate resistance to bending and breaking, the foam boards were subjected to the "180 degree bend" test. In this test, 1 ft by 2 ft (30.5 cm by 61.0 cm) pieces of each foam board were manually bent in half such that the board was bent back upon itself. The foam board was then examined to see whether it had broken or not.

Comparative Example 1

A 1.0 mil (25 micrometers) coextruded film comprising a 0.8 mil (20 micrometers) thick primary layer and a 0.2 mil (5 micrometers) thick adhesive layer was made on a conventional upward-blown film extrusion line at extrusion temperatures of 375° F. to 400° F. (191° C. to 204° C.). The primary layer comprised a blend of 85 percent LLDPE and 15 percent LDPE. The adhesive layer comprised a blend of 95 percent EVA and 5 percent silicon dioxide (SiO$_2$) in the form of a concentrate (15 percent SiO$^2$ in LDPE) as an antiblocking concentrate. The coextruded film was laminated and adhered at the EVA face to both primary surfaces of an extruded polystyrene foam board with a hot roll laminator operating at 375° F. (191° C.). The film exhibited 250 gm/in. (98.5 gm/cm) peel adhesion to the foam. The film had physical properties as set forth in Table 1.

Comparative Example 2

A coextruded film of substantially the same composition as the film of Comparative Example 1 was laminated in substantially the same manner to an extruded polystyrene foam board. In this comparative example however, the film was 3.0 mil (75 micrometers) thick, with the primary layer being 2.8 mil (70 micrometers) thick and the adhesive layer being 0.4 mil (10 micrometers) thick. The film had physical properties as set forth in Table 1.

Example 1

A 1.0 mil (25 micrometers) biaxially oriented polypropylene film (OPP) was extrusion coated with ethylene/vinyl acetate (EVA) to form a uniform 0.4 mil (10 micrometers) EVA adhesive layer across the OPP film. OPP/EVA film was then thermally laminated at the EVA face to both primary surfaces of an extruded polystyrene foam board with a hot roll laminator operating at 375° F. (191° C.). The film exhibited greater than 300 gm/in. (118.2 gm/cm) peel adhesion to the foam. The film had physical properties as set forth in Table 1.

Example 2

A 0.7 mil (18 micrometers) OPP film was extrusion coated with 0.4 mil (10 micrometers) EVA adhesive, and laminated to an extruded polystyrene foam board in substantially the same manner set forth in Example 1. The film had physical properties as set forth in Table 1.

Example 3

A 2.0 mil (50 micrometers) oriented high impact polystyrene film (HIPS) was extrusion coated with EVA to form a uniform 0.4 mil (10 micrometers) EVA adhesive. The HIPS/EVA film was then thermally laminated at the EVA face to both primary surfaces of an extruded polystyrene foam board with a hot roll laminator operating at 375° F. (191° C.). Adhesion of the film to the foam board was greater than 400 gm/in. (157.6 gm/cm). The film had physical properties as set forth in Table 1.

Example 4

A 1.0 mil (25 micrometers) biaxially oriented polyester film was thermally laminated to both primary surfaces of an extruded polystyrene foam board with a separate 1.0 mil (25 micrometers) EVA film as an adhesive layer. Both films were simultaneously adhered to both primary surfaces of the foam board with the EVA layer adjacent the foam board by using a hot roll laminator operating at 375° F. (191° C.). Adhesion of the film to the foam board was greater than 400 gm/in. (165.5 gm/cm). The film had physical properties as set forth in Table 1.

In the "ball drop" test, the ball fractured and completely penetrated the laminate foam board of Comparative Example 1. Comparative Example 2 laminate was seriously fractured by impact of the ball, although it did not penetrate the foam board. The laminate foam boards of Examples 1, 2, 3, and 4 all withstood 5 consecutive ball drops without suffering fracture or penetration.

In the "kneeling" test, the foam boards of Comparative Examples 1 and 2 averaged a rating of 2 and 3, respectively, while those of Examples 1, 3, and 4 averaged about 4–5 and exhibited little or no damage.

In the "180 degree bend" test, the foam boards of Examples 1, 2, 3, and 4 could all be bent without breaking. The foam boards of Comparative Examples 1 and 2 indeed broke prior to completing the 180 degree bend. It can be seen from Table 2 that the laminates of Example 1, 2, 3, and 4 exhibit greater flexural modulus values in both the extruded and the horizontal directions than do the non-oriented LLDPE-based films of Comparative Examples 1 and 2.

Example 5

The relationship of the incidence of the breakage of laminated boards versus their foam/facer film adhesive strength was evaluated.

Coated films were thermally laminated to both sides of 0.5 in. (12.7 millimeters) thick extruded polystyrene foam panels. 1.0 mil (25 micrometers) biaxially oriented polypropylene films were coated with different EVA/LDPE blends to achieve different levels of adhesion. The adhesive strength of the facer films to the foam panels was determined by the 180 degree peel test according to ASTM D-903. Laminate board specimens of 4 in. by 12 in. (10.2 cm by 30.5 cm) in size were then subjected to the 180 degree bend test. Six samples of each laminate foam board were evaluated. Breakage of the foam was noted as failure.

Adhesion strengths of greater than 100 gm/in. (39.4 gm/cm) were needed to achieve acceptable bend and breakage resistance characteristics. The results are seen in Table 3.

TABLE 1

PHYSICAL PROPERTIES OF FACER FILMS

| Example | Film Composition | MD Yield Tensile Strength (psi) | TD Yield Tensile Strength (psi) | MD Percent Elongation (percent) | TD Percent Elongation (percent) | MD One Percent Secant Modulus (psi) | TD One Percent Secant Modulus (psi) |
|---|---|---|---|---|---|---|---|
| Comp. Ex. 1 | 1.0 mil LLDPE/ EVA coextruded | 1,810 | 1,480 | 510 | 600 | 24,600 | 31,400 |
| Comp. Ex. 2 | 3.0 mil LLDPE/ EVA coextruded | 1,410 | 1,420 | 640 | 690 | 27,600 | 32,000 |
| Example 1 | 1.0 mil OPP/ 0.4 mil EVA coated | 17,190 | 30,870 | 180 | 70 | 254,000 | 424,000 |
| Example 2 | 0.8 mil OPP/ 0.4 mil EVA coated | 14,930 | 28,180 | 175 | 45 | 260,300 | 423,100 |
| Example 3 | 2.0 mil HIPS/ 0.4 EVA coated | 7,630 | 7,780 | 70 | 100 | 317,000 | 312,800 |
| Example 4 | 1.0 mil PET/ 1.0 mil EVA | 12,690 | 24,540 | 130 | 85 | 489,500 | 565,100 |

MD = machine direction
TD = transverse direction

TABLE 2

PHYSICAL PROPERTIES AND APPLICATION STRESS TEST RESULTS

| Example | Facer Film | Ext. Flex. Modulus (psi) | Horz. Flex. Modulus (psi) | Ball Drop (Damage?) | Ball Drop (Penetrate?) | Kneeling (Rate 1–5) | 180 Degree Foam Bend (Break?) |
|---|---|---|---|---|---|---|---|
| Comp. Ex. 1* | 1.0 mil LLDPE/ EVA coextruded | 4,640 | 1,550 | Fractured on 1 drop | Yes | 2.2 | Yes |
| Comp. Ex. 2* | 3.0 mil LLDPE/ EVA coextruded | 4,800 | 1,990 | Fractured on 1 drop | No | 3 | Yes |
| Example 1 | 1.0 mil OPP/ 0.4 mil EVA coated | 4,850 | 3,780 | 5 + drops, no fractures | No | 4.6 | No |
| Example 2 | 0.8 mil OPP/ 0.4 mil EVA coated | 6,250 | 5,800 | 5 + drops, no fractures | No | — | No |
| Example 3 | 2.0 mil HIPS/ 0.4 EVA coated | 10,380 | 9,650 | 5 + drops, no fractures | No | 4.9 | No |
| Example 4 | 1.0 mil PET/ 1.0 mil EVA | 8,060 | 5,260 | 5 + drops, no fractures | No | 4.5 | No |

*Not an example of the present invention
Ext. Flex. Modulus = flexural modulus of the laminated board in the extrusion direction according to ASTM C203-91
Horz. Flex. Modulus = flexural modulus of the laminated board in the horizontal direction according to ASTM C203-91

TABLE 3

BEND TEST RESULTS VERSUS PEEL STRENGTH

| Specimen | Adhesive Composition | Peel Strength gm/in. (gm/cm) | 180 Degree Foam Bend Test (percent of boards failing) |
|---|---|---|---|
| 1 | 95 percent EVA/5 percent LDPE | 420(165.5) | 0 |
| 2 | 85 percent EVA/15 percent LDPE | 300(118.2) | 0 |
| 3 | 70 percent EVA/30 percent LDPE | 130(51.22) | 17 |
| 4* | 55 percent EVA/45 percent LDPE | 40(15.76) | 50 |
| 5* | 35 percent EVA/65 percent LDPE | 5(1.97) | 100 |

*Not an example of the present invention

While embodiments of the laminate foam board of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. An insulated building frame wall, the frame wall having attached thereto a laminated insulating foam board, comprising:
   a) a panel of a plastic foam material of about ¼ inch to about 1 inch in thickness; and
   b) first and second thermoplastic facer films each adhered to primary, opposite surfaces of the panel, the facer films being biaxially oriented, the facer films each having a thickness of about 0.35 to about 10.0 mils, the adhesion between the facer films and the panel being about 100 grams per inch or more, the facer films each further having:
      i) an ultimate elongation of less than 200 percent in both machine and transverse directions;
      ii) a yield tensile strength of at least 7,000 pounds per square inch in both machine and transverse directions; and
      iii) a 1 percent secant modulus of at least 200,000 pounds per square inch in both machine and transverse directions.

2. The frame wall of claim 1, wherein the adhesion between the facer films and the panel is about 250 grams per inch or more.

3. The frame wall of claim 2, wherein the panel is of extruded polystyrene foam.

4. The board of claim 2, wherein the facer films are polypropylene films.

5. The frame wall of claim 1, wherein the facer film is from about 0.5 to about 2.0 mils thick.

6. The frame wall of claim 1, wherein the panel is of extruded polystyrene foam.

7. The frame wall of claim 1, wherein the facer film has a yield tensile strength of at least 10,000 pounds per square inch in both machine and transverse directions.

8. The board of claim 1, wherein the facer films are adhered to the panel by means of adhesive layers.

9. The board of claim 1, wherein the facer film is from 0.5 to 2.0 mils thick, the adhesion between the facer films and the panel being of about 250 grams per inch or more, the facer films having a yield tensile strength of at least 10,000 pounds per square inch in both machine and transverse directions, the facer films being adhered to the panel by means of adhesive layers.

10. The frame wall of claim 9, wherein the panel is of extruded polystyrene foam.

11. The frame wall of claim 9, wherein the facer films are polypropylene films.

12. The frame wall of claim 1, wherein the panel is a polystyrene beadboard foam.

13. The frame wall of claim 1, wherein the panel comprises a polystyrene foam, the foam having a density of about 10 to about 150 kilograms per cubic meter, the foam having an average cell size of from about 0.1 millimeter to about 5.0 millimeters, the foam being closed cell.

14. The frame wall of claim 1, wherein the panel comprises a polystyrene foam, the foam having a density of about 10 to about 70 kilograms per cubic meter, the foam having an average cell size of from about 0.2 millimeter to about 1.5 millimeters, the foam being closed cell.

15. The frame wall of claim 1, wherein the panel comprises a polyisocyanurate or polyurethane foam, the foam having a density of about 10 to about 150 kilograms per cubic meter, the foam having an average cell size of from about 0.05 millimeter to about 5.0 millimeter, the foam being closed cell.

16. The frame wall of claim 1, wherein the panel comprises a polyisocyanurate or polyurethane foam, the foam having a density of about 10 to about 70 kilograms per cubic meter, the foam having an average cell size of from about 0.1 millimeter to about 1.5 millimeters, the foam being closed cell.

17. The frame wall of claim 1, wherein the foam material is closed cell.

18. The frame wall of claim 1, wherein the panel is about ½ to about 1 inch is thickness.

19. The frame wall of claim 1, wherein the panel comprises an extruded polystyrene foam, the foam having a density of about 10 to about 150 kilograms per cubic meter, the foam having an average cell size of from about 0.1 millimeter to about 5.0 millimeters, the foam being closed cell, the facer film being from 0.5 to 2.0 mils thick, the adhesion between the facer films and the panel being of about 250 grams per inch or more, the facer films having a yield tensile strength of at least 10,000 pounds per square inch in both machine and transverse directions, the facer films being adhered to the panel by means of adhesive layers.

20. The frame wall of claim 19, wherein the foam has an average cell size of from about 0.1 millimeter to about 5.0 millimeters, the foam having a density of about 10 to about 150 kilograms per cubic meter, the facer films being polypropylene films.

21. The frame wall of claim 20, wherein the panel has a thickness of ½ inch.

22. The frame wall of claim 20, wherein the panel has a thickness of 1 inch.

23. The frame wall of claim 19, wherein the panel has a thickness of ½ inch.

24. The frame wall of claim 19, wherein the panel has a thickness of 1 inch.

* * * * *